United States Patent [19]

Wolgemuth

[11] 4,018,744

[45] Apr. 19, 1977

[54] STORAGE STABLE POLYESTER-POLYURETHANE-PRODUCING COMPOSITIONS

[75] Inventor: Larry G. Wolgemuth, Cherry Hill, N.J.

[73] Assignee: Atlantic Richfield Company, Los Angeles, Calif.

[22] Filed: Feb. 13, 1976

[21] Appl. No.: 657,680

Related U.S. Application Data

[63] Continuation-in-part of Ser. No. 457,942, April 4, 1974, Pat. No. 3,950,285.

[52] U.S. Cl. .................. 260/77.5 B; 260/77.5 MA; 260/77.5 TB; 427/27
[51] Int. Cl.² .................. C08G 18/80; C08G 18/34
[58] Field of Search .............. 260/77.5 TB, 77.5 B, 260/77.5 MA

[56] References Cited

UNITED STATES PATENTS 2,801,231   7/1957   Caldwell ................... 260/77.5 B
3,291,763  12/1966   Becalick et al. ............ 260/77.5 B Primary Examiner—H.S. Cockeram
Attorney, Agent, or Firm—Coleman R. Reap

[57] ABSTRACT

A shelf-stable heat curable, polymer-producing composition is presented comprised of an organic polycarbamic acid ester, an organic polycarboxylic acid ester of a monohydric alcohol, an organic polyhydroxyl compound and an organotin condensation-rearrangement catalyst. The composition may be in the form of a liquid and it may be dissolved in a solvent or it may be in the form of a dry powder.

2 Claims, No Drawings

STORAGE STABLE POLYESTER-POLYURETHANE-PRODUCING COMPOSITIONS

BACKGROUND OF THE INVENTION

This application is a continuation-in-part of copending application Ser. No. 457,942, filed Apr. 4, 1974, and now U.S. Pat. No. 3,950,285.

This invention relates to polyurethanes and more particularly to an improved process for preparing polyurethanes and polyester polyurethanes and to heat curable polyester polyurethane producing compositions.

Over the past 25 years, the production of polyurethanes for industrial use and for use in the manufacture of market products has increased manyfold. Polyurethanes are conventionally manufactured by reacting polyisocyanates with polyether or polyester polyol compounds because of the low cost and high reactivity of these compounds. However, great care must be exercised by those handling isocyanates because of their extremely high toxicity. Because of the inherent hazards of handling isocyanates, continuing research for alternate methods of preparing polyurethanes which are competitive costwise with the conventional isocyanate-polyester polyol processes, and which are relatively free of safety hazards are constantly being sought.

British Pat. No. 944,310, published Dec. 11, 1963, discloses a method of producing certain polyurethanes by reacting dicarbamates with polyhydric alcohols in the presence of an ester interchange catalyst at temperatures of 150° to 210° C. U.S. Pat. No. 3,676,402, issued July 11, 1972, discloses the deblocking of blocked isocyanates followed by reaction with polyhydric compounds in the presence of stannoxane catalysts to form polyurethanes.

An improved method has now been discovered for preparing polyurethanes and polyester-polyurethanes without the necessity of using highly toxic isocyanates. Storage stable compositions have also been discovered which can be easily heat cured to valuable polyester polyurethane products.

Accordingly, it is an object of the invention to present an improved process for preparing polyurethanes and polyester polyurethanes.

It is another object of the invention to present a process for preparing polyurethanes which avoids the necessity of handling highly toxic isocyanates.

It is another object of the invention to present an improved process for preparing substantially linear high molecular weight polyurethanes and polyester polyurethanes.

It is another object of the invention to present a method of preparing polyurethanes from difunctional carbamates without the necessity of resorting to high reaction temperatures.

It is another object of the invention to present heat curable polyester polyurethane-producing compositions which are storage stable at ordinary room temperatures.

These and other objects of the invention will become readily apparent from the description and examples of the invention which follow.

SUMMARY OF THE INVENTION

According to one aspect of the invention, polyurethanes and polyester polyurethanes are prepared by reacting organic polycarbamates or a mixture of organic polycarbamates and polycarboxylic acid esters with polyhydric organic compounds in the presence of organotin catalysts at a temperature of about 60° to 180° C. The preferred organic polycarbamates are the di and trifunctional aromatic carbamates of saturated aliphatic alcohols having up to 6 carbon atoms; the preferred carboxylic acid esters are the aliphatic di and tricarboxylic acid esters of aliphatic alcohols having up to 6 carbon atoms and the preferred polyhydric organic compounds are the di and tri hydric aliphatic alcohols containing 2 to 12 carbon atoms. The preferred catalysts are tin oxides and tin alkoxides in which the alkyl groups contain up to 16 carbon atoms. The preferred temperature range is about 100° to 160 ° C.

According to an alternate aspect of the invention, storage stable compositions which are heat curable to polyester polyurethanes are presented which are comprised of a polycarbamic acid ester, a polycarboxylic acid ester, a polyhydroxy organic compound, and an organotin catalyst. These compositions may be in the liquid or dry powdered form.

DESCRIPTION OF THE INVENTION

The polyurethanes and polyester polyurethanes are prepared in this invention by the reaction of polycarbamic acid esters and/or carboxylic acid esters with polyhydroxyl organic compounds. According to the probable reaction mechanism, the hydroxyl groups of the polyhydroxy organic compound replace the alcohol moieties of the esters resulting in the addition copolymerization of the reactants to high molecular weight polymers.

THE POLYCARBAMIC ACID ESTERS

The organic dicarbamates useful in the invention are those having the structural formula

wherein n is an integer varying from 1 to 5, R preferably contains 2 to about 50 carbon atoms, and R' and R'' are the same or different hydrocarbon or ether radicals, and desirably contain up to 12 carbon atoms.

When it is desired to prepare highly linear polymers n is usually 1, and where cross-linked polymers are desired n may be higher than 1 and up to 5 or more, although it is not economically feasible to produce and use carbamic acid ester compounds in which n is higher an about 6.

The backbone organic radical represented by R may contain from 2 to about 50 or more carbon atoms. Polycarbamates having an organic backbone containing more than 50 carbon atoms may be prepared by prepolymerization of polyisocyanates and polyols with an excess of the polyisocyanate to produce isocyanate-terminated prepolymers and reacting, these with monoalcohols to produce high molecular weight carbamate terminated prepolymers. However, it is preferred to use polycarbamic esters of lower molecular weight, i.e. those with R containing up to about 50 carbon atoms and preferably with R containing from 4 to 18 carbon atoms since the higher molecular weight polycarbamic acid esters do not present any significant advantage over the lower molecular weight carbamates and are more difficult and costly to produce. R may be any organic radical which does not contain any substituents which would interfere with the desired reaction of the invention, i.e., the transesterification of the alcohol moieties of the polycarbamic acid esters or polycarboxylic acid esters and the polyhydroxyl compounds. R is often a hydrocarbon radical or an organic radical containing only ether or ester linkages in addition to the carbon-carbon linkages. R may be an aliphatic including saturated or ethylinically unsaturated radical, a cycloaliphatic, including saturated and ethylinically unsaturated cycloaliphatic radical; an aromatic, including benzenoid and polynuclear fused ring aromatic, radical; an aromatic-substituted alkyl or an alkyl-substituted aromatic radical; etc.

The esterifying radicals R' and R" may contain up to 12 or more carbon atoms and in the preferred embodiment are hydrocarbon or ether groups. It is usually preferred that these groups be easily removable from the reaction mixture when they are replaced by polyol compounds during the transesterification. Thus the lower molecular weight more volatile organic compounds are preferred. In the most preferred embodiment R' and R" are alkyl groups containing up to 6 carbon atoms. R' and R" are also free of substituents which would interfere with the desired reaction. Examples of radicals suitable for use as R' and R" are methanol, propanol, hexanol, phenol, p-chlorophenol, p-nitrophenol, cyclohexanol, etc.

Typical polycarbamates for use in the invention include 1,2-dimethylenebis(methyl carbamate), 1,4-tetramethylene bis(ethyl carbamate), 1,6-2-methyl hexane bis (isopropyl carbamate), 1,4-phenylene bis(butyl carbamate), 1,4 tetramethylene bis(p-phenylene ethyl carbamate), 3,5-tolylene bis(phenyl carbamate), 1,4 cyclohexene bis(methyl carbamate), 1,5 pentamethylene bis(p-nitrophenyl carbamate), 1,2,3-trimethylene tris (ethyl carbamate), 2,4,6 benzene tris(hexyl carbamate), etc.

THE POLYCARBOXYLIC ACID ESTERS

The polycarboxylic acid esters useful in the invention are those which are free of substituents which interfere with the desired transesterification reaction with the poly-hydroxyl containing organic compound. The functionality of these compounds may vary from 2 to 6 or more, but it is usually preferred, from an economic standpoint, not to use compounds having more than 6 functional groups. In preparing high molecular weight substantially linear polymers, it is preferred to use carboxylic acid esters having 2 functional groups to reduce the amount of cross-linking in the product. As is the case with the polycarbamic acid esters, the backbone portion of the carboxylic acid esters may be aromatic, saturated or ethylenically unsaturated, or aliphatic or cycloaliphatic in structure and may contain non interfering groups as ether and ester linkages, nitro groups, mercapto groups, etc. The ester portion of the carboxylic acid esters may be identical or different and preferably contains up to about 12 carbon atoms, although higher molecular weight compounds can be used. In the most preferred embodiment of the invention the polycarboxylic acids are esterified with compounds, particularly monoalcohols, containing up to 6 carbon atoms since these are most easily replaced by the functional groups of the polyhydroxy compound and most easily removed from the reaction medium. Examples of preferred esterifying radicals are methanol, propanol, hexanol, phenol, p-chlorophenol, p-nitrophenol, cyclohexanol, etc.

Higher molecular weight polycarboxylic acid esters such as those prepared by the condensation of polycarboxylic acids and polyols wherein the molecular amount of polycarboxylic acid is present in excess over the polyol to produce carboxyl-terminated polymers can also be used in the invention. The molecular weight of such polymers may range up to about 10,000 or more, and their carboxyl functionality may vary from 2 to 6 groups per molecule.

Typical polycarboxylic acid esters usable in the invention include esters of saturated fatty acids such as dimethyl oxalate, diethyl malonate, dimethyl succinate, dibutyl azelate, diphenyl adipate, triethyl ester of decane 1,610-tricarboxylic acid, triphenyl ester of eicosane, 1,10,20-tricarboxylic acid; esters of unsaturated fatty acids such as diethyl maleate, dibutyl citraconate, diphenyl itaconate, tripropyl aconitate, dibutyl ester of 4-hexadecene, 1–16 dicarboxylic acid, etc; esters of poly-aromatic acid, such as dimethyl phthalate, dibutyl naphthalate, triethyl trimellitate, diphenyl phthalate, etc.

THE POLYOL COMPOUNDS

Suitable organic polyol compounds preferred for use in the invention include aliphatic and aromatic polyols and polymers such as polyester polyols and polyether polyols having from 2 to 6 or more —OH groups per molecule and having 2 to about 100,000 carbon atoms with hydroxyl numbers ranging from 12 to 1,100 or more. Mixtures of two or more of these compounds can also be employed.

The aliphatic and aromatic polyols include, for example, ethylene glycol; diethylene glycol; propylene glycol; 1,3-butylene glycol; 1,4-butanediol; 1,6-hexanediol; butenediol; butynediol; amylene glycols; 2-methyl-pentanediol-2,4; 1,7-hepanediol; glycerine; neopentyl glycol; trimethylol propane; pentaerythritol; cyclohexane dimethanol; sorbitol; mannitol; glactitol; talitol; xylitol; 1,2,5,6-tetrahydroxyhexane; styrene glycol; bis(hydroxyethyl) diphenyl-dimethylmethane; silanediols, e.g., triphenyl silanols; 1,4-dihydroxybenzene; etc.

The polyhydroxyl-containing polymeric compounds useful in this invention include, for instance, polyhydric polyalkylene ethers, polyhydroxyl polyesters, and hydroxyl group-containing, preferably hydroxyl-group terminated, polymers. The polyhydric polyalkylene ethers may have a molecular weight greater than about 350 and a hydroxyl numer of from about 10 to 600 and may be derived, for example, by the polymerization of alkylene oxides, such as ethylene oxide, propylene oxide, butylene oxide, and the like. Polyhydric polyalkylene ethers may also be prepared by the polymerization of the cyclic ethers, such as, for example, dioxane, tetrahydrofuran, and the like, and by the condensation of an alkylene oxide with a glycol such as ethylene glycol, propylene glycol, butylene glycol, and the like.

The hydroxyl-containing polyesters may be obtained by the reaction of aliphatic or aromatic dicarboxylic acids with aliphatic or aromatic polyhydric alcohols in the manner well known to the art in proportions that result in esters having at least two reactive hydroxy groups. Any polyols may be used to form the esters, and illustrative of such are those listed above. Included within the suitable esters are the mono and diglycerides of castor oil, tall oil, soya oil, linseed oil, etc. The latter esters are usually prepolymers prepared by the reaction of the fatty glyceride with low molecular weight polyhydric alcohols. Illustrative, for instance, of castor oil-based prepolymers are propylene glycol monoricinoleate, propylene glycol mono-12-hydroxystearate, neopentyl glycol monoricinoleate, dehydrated castor oil, ethylene glycol monoricinoleate, ethylene glycol mono-12-hydroxystearate, triglyceride or ricinoleic acid, epoxidized castor oil, and pentaerythitol tetrarincinoleate. Other polyhydroxyl-containing polymers, such as those derived from 1,4-butadiene; isoprene; 2,3-dimethylbutadiene; 2-chloro-1,3-butadiene; 2-cyano1,3-butadiene; and other polymerizable ethylenically unsaturated monomers such as α-olefins of up to 12 carbon atoms such as ethylene, propylene, butene, etc.; styrene acrylonitrile, acrylic acid or ester, methacrylic acid or ester, vinyl chloride, vinylidine chloride, and the like; hydroxyl-terminated condensates of phenol and lower aldehydes and hydroxy-terminated polyepoxides. A particularly suitable hydroxyl-containing compound is styrene-vinyl alcohol copolymer, made by copolymerizing styrene and vinyl acetate and partially or fully hydrolyzing the acetate groups to alcohol groups.

The preferred compounds are the polyols, particularly the polyester and polyether polyols.

The functionality of the polycarbamic acid ester, polycarboxylic acid ester and the organic polyol compound is at least 2. It is obten desirable that the functionality of one of both of the reacting components be higher than 2. In general, it is preferred that the polycarbamic acid ester and polycarboxylic acid ester used have a functionality of two and the functionality of the polycarboxylic acid ester and organic polyol be varied since it is much more economical to prepare polyfunctional carboxylic acid ester and hydroxyl compounds than polyfunctional carbamates.

The relative amounts of carbamic acid ester to carboxylic acid ester used to prepared the compositions of the invention may vary depending upon the properties desired in the product. In general, the weight ratio of carbamic acid ester to carboxylic acid ester varies between 1:9 to 9:1 and preferably between 75:25 to 25:75.

The ratio of total polycarbamic acid ester and polycarboxylic acid ester, and polyol compounds may also vary depending upon the desired properties of the product and the functionality of the reacting materials. In general, it is desired to use amounts of polycarbamic acid ester and polycarboxylic acid ester, and organic polyhydroxyl compounds that will provide a ratio of total carbamate and carboxylate functional groups to total polyhydroxyl groups of about 0.7 to 10:1 and preferably 0.7 to 1.4:1.

THE CATALYSTS

The catalysts used in the process of the invention are organotin compounds sufficiently soluble in the reaction medium to provide an amount of catalyst in solution to effect the desired reaction. Those found most suitable are the tin oxides, tin alkoxides and tin salts of organic acids. Among the suitable tin compounds are tin oxides containing one, two or three aromatic or saturated or ethylenically unsaturated aliphatic or cycloaliphatic groups such as alkyl, aryl alkaryl, aralkyl groups or mixtures of these, the alkoxides of these tin oxides, the alcohol portion of which boils below about 150° C., and the alkyl, aryl, alkaryl and arakyl salts of fatty acids containing up to 30 carbon atoms and preferably about to 24 carbon atoms. Examples of specific tin compounds are: tin oxides, such as diethyl tin oxide, dipropyl tin oxide, dibutyl tin oxide, trihexyl tin oxide, diphenyl tin oxide, trinaphthyl tin oxide, butyl phenyl tin oxide, ditolyl tin oxide, dibutylpropyl tin oxide, etc.; tin alkoxides, such as dibutyl tin dimethoxide, diphenyl tin dibutoxide, phenyl butyl tin diethoxide, tributyl tin dipentoxide, dibutyl phenyl tin butoxide, napthyl diethyl tin diphenoxide, triphenyl tin methoxide, etc.; tin salts of fatty acids, such as stannous octoate dibutyltin dilaurate, triphenyltin butyrate, etc.

The amount of catalyst used in the process of the invention will vary depending upon the particular reactants, the reaction temperature and the properties desired in the product. In general, it is desirable to use amounts of 0.005% to 5% and preferably about 0.05% to 2%, based on the total weight of the reactants. Amounts above or below this range may sometimes be effective to produce the desired results, but it is preferred that the catalyst concentration be within these limits for the sake of economy and feasibility.

If desired, a cocatalyst such as an alkali metal salt of a fatty acid, preferably a saturated aliphatic fatty acid containing 12 to 24 carbon atoms, may be added to the reaction system. Examples of these are sodium stearate, potassium laurate, etc. The concentration range for the cocatalyst is the same as that of the principal catalyst, i.e., the tin compound.

In accordance with the usual practice, inert, inorganic or organic fillers or both, and other additives may be included in the reaction mixture. Suitable inert, inorganic materials include, for example, clay, talc, silica, carbon black, asbestos, glass, mica, calcium carbonate, antimony oxide, and the like. Organic fillers include, for instance, the various polymers, copolymers, and terpolymers of vinyl chloride, vinyl acetate, acrylonitrile, acrylamide, styrene, ethylene, propylene, butadiene, divinylbenzene, etc. Other additives which may be added include plasticizers, extenders, softeners, coloring agents, and emulsifiers.

The reaction is carried out at a temperature above about 60° C. and is usually conducted at a temperature between about 60° and 180° F. It is often preferable, especially when producing high molecular weight linear polymers to carry out the reaction at a temperature of about 100° to 160° C. Reactions at higher temperatures sometimes result in undesired formation of cross-linked product.

The process of the invention may be used to make a variety of products. For example, by using an excess of polyhydroxyl compound, hydroxyl terminated prepolymers can be prepared. These are valuable intermediate products which can be subsequently reacted with additional isocyanate to produce polyurethanes. Substantially linear high molecular weight polyurethanes and polyester polyurethanes can be prepared by the process of the invention by using reactants which are difunctional or substantially difunctional. As mentioned above, the reaction can be conducted at lower temperatures to prevent, or greatly retard, the formation of cross-linked product.

The reactants can be combined into a storage stable composition which can be used for coatings, adhesive applications, etc. These compositions can be in the form of a liquid and stored as is or stored in a solvent in a container. They can also be in the form of a dry powder. These storage-stable mixtures will not react to an appreciable extent until they are heated. Thus they can be applied to a surface and heated, as by baking, until the desired result is obtained.

The storage stable polyester-polyurethane producing mixtures can be prepared by combining one or more polycarbamates, one or more polycarboxylic acid esters, one or more polyols and an organotin catalyst and blending the combination to obtain a homogeneous mixture. If it is desired to prepare a liquid mixture reactants are chosen which will produce a liquid. Alternatively an inert solvent can be added to the reaction mixture if it is desired to dissolve one or more of the reactants e.g., when one or more of the reactants is a solid, or if it is desired to prepare a more dilute mixture.

If it is desired to prepare a mixture in dry powdered form one or more of the components must itself be solid material at storage temperatures. The mixture is preferably blended thoroughly to obtain a uniform mixture of the reactants. In preparing the powdered mixture from solid components the various components may be ground separately or combined and ground together. Since heat initiates reaction between the carbamate and/or carboxylic acid ester groups and the polyol groups it is preferred to grind the ingredients of the powder formulation separately or under conditions such that excess heat is not produced. One particularly suitable method is freeze grinding in which the material is frozen before grinding to minimize the temperature rise of the mixture. There are many well known suitable methods for grinding the reactant materials to a size suitable for any desired applications such as powder coating or other coating techniques and the method of size reduction of the mixture prepared in this embodiment of the invention forms no part of the invention.

Partially esterified shelf-stable compositions can also be prepared by reacting a polycarbamate and a polycarboxylic acid ester with an insufficient amount of polyhydroxyl compound to completely transesterify all of the carbamate and polycarboxylic acid ester groups. Such compositions also have utility as shelf-stable coating and adhesive compositions which are applied to a surface and heated to effect curing. Storage-stable powder coating compositions can be cured by the process of this invention by selecting reactants which are solid at room temperature or which combine to form a solid mixture and which can be finely ground to a powder. The powdered mixture complete with catalyst is applied to the surface by electrostatic or other desired methods and heated in situ to the temperature at which the transesterification is to take place.

Other desired additives, described above, may be incorporated in the reaction mixture prior to storage or at the time of use. The additives may be simply blended into the polymer-producing composition.

The storage-stable compositions may be stored indefinitely at ordinary storage temperatures, preferably in moisture-proof containers. When it is desired to use the compositions they are used in the same manner as freshly prepared polyurethane producing formulations.

The process of the invention may be carried out by combining the desired reactants and catalyst in the desired container or on a surface to be treated and the temperature of the mixture raised to the desired level and held there until the reaction is complete. It may be desirable to pass an inert gas through the reactor to remove water and molecular oxygen from the system. Water might react with or dilute the effect of the catalyst and certain hydroxyl group-containing compounds, e.g. poly (tetramethylene ether), are sensitive to molecular oxygen at the reaction temperatures. If desired, the reaction may be carried out in a substantially oxygen-free atmosphere by maintaining a nitrogen or other inert gas atmosphere in the reaction vessel. The reaction mixture is advantageously stirred during the reaction. It is often advantageous to carry out the reaction in an inert solvent so that as the reactants combine, the viscosity of the mixture can be maintained low enough to facilitate efficient agitation. This is especially important when high molecular weight products are being made. Preferred solvents include aromatic hydrocarbons, aliphatic and cyclic ethers, ketones, etc. such as the xylenes, alkyl and halo-substituted benzenes, dioxane, tetrahydrofuran, dimethyl sulfoxide, and dimethyl formamide.

The following working examples illustrate specific embodiments. Unless otherwise indicated, parts and percentages are on a weight basis.

EXAMPLE I

To a 100 ml. resin kettle fitted with a mechanical stirrer, a nitrogen inlet and exit port and heated by an oil bath is added 20.0 g. of a tetramethylene ether glycol (M.W. about 1000, OH No. 109) and 0.1 g. dibutyltin dibutoxide. The solution is then heated to 100° C. and degassed for one hour at 1.5 cm. Hg. A nitrogen sweep is introduced into the reactor and 5.30 g. of ethyl 2,4-tolyldicarbamate is added to the reaction mixture. The reaction mixture is heated at 120° C. with stirring for 22 ¾ hours. The inherent viscosity of the product is 0.381 (0.2 g. product per 100 ml. DMF at 30° C.).

EXAMPLE II

The reaction described in Example I is repeated in the presence of 0.1 g. sodium stearate added with the ethyl 2,4-tolyldicarbamate. Reaction time, 25 ½ hours. The inherent viscosity of the product if 0.427 (0.2 g. product in 100 ml. DMF at 30° C.).

EXAMPLE III

To the same reactor as described in Example I is added 20.0 g. of a tetramethylene ether glycol (M.W. about 2,000, OH No. 55) and 0.1 g. of dibutyltin dibutoxide. The solution is then heated to 100° C. and degassed for 1 hour at 1.5 cm Hg. A nitrogen sweep is introduced into the reactor and 2.92 g. of ethyl 2,4-tolyldicarbamate is added to the reaction mixture. The reaction mixture is heated at 100° C. with stirring for three hours. Sodium stearate (0.1 g) is added and the reaction mixture heated an additional 7 ¼ hours with stirring. The reaction mixture is very viscous after this time. The product has an inherent viscosity of 0.253 (0.2 g. product per 100 ml. DMF at 30° C.).

EXAMPLE IV

The reaction described in Example II is repeated at 140° C. The total reaction time is 6 hours. The inherent viscosity of the product is 0.353 (0.2 g. product in 100 ml. DMF at 30° C.).

EXAMPLE V

The reaction procedure of Example IV is repeated using 20.0 g. of tetramethylene ether glycol (M.S. 1,000, OH No. 109), 8.25 g. of ethyl 2,4-tolyldicarbamate, 1.0 g. 1,4-butanediol, 0.10 g. dibutyltin dibutoxide and 0.10 g. of sodium stearate. The reaction time is 6 hours. The inherent viscosity of the product is 0.296 (0.2 g. of product per 100 ml. DMF at 30° C.).

EXAMPLE VI

To a 500 ml. resin kettle equipped with a mechanical stirrer, a Dean-Stark trap, a condenser, and a nitrogen sweep are added 62.60 g. of 1,4-butanediol, 1.0 g. of dibutyltin oxide and 25 g. of toluene. The reaction mixture is heated in an oil bath at 175° C. until 28 cc of material is collected in the Dean-Stark trap.

To this mixture are added 91.00 g. of dimethyl adipate and 46.40 g. of ethyl 2,4-tolyldicarbamate and the reaction mixture is heated at 140° C. under a nitrogen sweep for 6 hours and at 140° C. for an additional 6 ½ hours under 1 mm. Hg. vacuum. The product, a yellow brown polymer, has an inherent viscosity of 0.269 (0.2 g. product per 100 ml. DMF at 30° C.).

The above examples illustrate principal features of the invention. In Examples I to V polyurethane is prepared at various temperatures by transesterification of the dicarbamates. In Example VII polyester polyurethane is prepared.

EXAMPLE VII

A storage-stable liquid polyester polyurethane composition is prepared as follows:

To a suitable container are added 1.0 mole of 1,4-butane diol, 0.8 mole of dimethyl adipate, 0.2 mole of methyl 2,4-tolyldicarbamate, 1.0 gm of dibutyltin oxide and 25 gms of toluene. The mixture is stirred until the methyl 2,4-tolyldicarbamate completely dissolves. The mixture is stored at room temperature under anhydrous conditions for six months. Upon examination it will be found to be substantially chemically unchanged. When a portion of the stored mixture is heated to and maintained at a temperature of about 160° C for 10 hours a viscous polymeric product will be obtained.

EXAMPLE VIII

A dry powder storage-stable polyester-polyurethane producing composition is prepared as follows:

A mixture is prepared by combining 1.0 mole of cyclohexenyl dimethanol, 0.8 mole of dimethyl terephthalate, 0.2 mole of methyl 2,4-tolyldicarbanate and 1.0 gm of dibutyltin oxide. This mixture is ground in a ball mill until a fine powdered mixture is obtained. The powdered mixture is stored for 6 months at room temperature under anhydrous conditions. Upon examination it will be found to be substantially chemically unchanged. When a portion of the stored powdered composition is applied to a metallic surface by elecrostatic coating techniques a polymeric coating will be formed on the metallic surface.

Examples VII and VIII illustrate storage-stable embodiments of the invention.

Although the invention is described with specific working examples, it is to be understood that the scope of the invention is not limited thereto but is determined by the breadth of the appended claims.

I claim:

1. A storage-stable composition which is thermally curable to high molecular weight polyester polyurethanes comprising
   a. an organic polycarbamic acid ester having the structural formula

wherein n is 1 to 5, R is an organic radical containing 2 to about 50 carbon atoms and R' and R'' are the same or different organic radicals containing up to 12 carbon atoms,
   b. an organic polycarboxylic acid ester having a molecular weight of about 118 to 462 the alcohol portion of which is a monoalcohol,
   c. an organic polyhydroxy compound having a molecular weight of about 64 to 2,000, and
   d. about 0.005 to 5.0%, based on the total weight of (a), (b) and (c) of a latent curing catalyst comprised of an organotin compound, said (a), (b) and (c) being free of substituents which interfere with the desired reaction, the equivalent ratio of (a) to (b) varying from 1:9 to 9:1 and the equivalent ration of total (a) and (b) to (c) varying from 0.7 to 10:1.
2. The composition of claim 1 in dry powdered form.